(12) United States Patent
Sawada

(10) Patent No.: US 7,643,585 B2
(45) Date of Patent: Jan. 5, 2010

(54) METHOD FOR CORRECTING SOFT DECISION VALUE, COMPUTER PROGRAM PRODUCT FOR THE SAME, AND RECEPTION APPARATUS FOR THE SAME

(75) Inventor: Manabu Sawada, Yokohama (JP)

(73) Assignee: DENSO CORPORATION, Kariya (JP)

( * ) Notice: Subject to any disclaimer, the term of this patent is extended or adjusted under 35 U.S.C. 154(b) by 568 days.

(21) Appl. No.: 11/581,440

(22) Filed: Oct. 17, 2006

(65) Prior Publication Data

US 2007/0116140 A1    May 24, 2007

(30) Foreign Application Priority Data

Nov. 18, 2005    (JP)    ............... 2005-334221

(51) Int. Cl.
| | |
|---|---|
| H04L 27/22 | (2006.01) |
| H04L 5/12 | (2006.01) |
| H04L 23/02 | (2006.01) |
| H04K 1/10 | (2006.01) |
| H04L 27/28 | (2006.01) |

(52) U.S. Cl. ................ 375/341; 375/260; 375/261; 375/324

(58) Field of Classification Search ............... 375/260, 375/261, 322, 324, 340, 341; 714/794, 795
See application file for complete search history.

(56) References Cited

U.S. PATENT DOCUMENTS

| | | | |
|---|---|---|---|
| 5,566,191 A | 10/1996 | Ohnishi et al. | |
| 6,754,291 B1 | 6/2004 | Okanoue et al. | |
| 7,020,459 B2 | 3/2006 | Nagayasu | |
| 7,106,810 B2 * | 9/2006 | Collins et al. | ............... 375/341 |
| 7,397,758 B1 * | 7/2008 | Hart et al. | ............... 370/208 |
| 2004/0037262 A1 * | 2/2004 | Tanada | ............... 370/342 |
| 2004/0156450 A1 * | 8/2004 | Auranen et al. | ............... 375/324 |
| 2006/0126761 A1 | 6/2006 | Bernhardsson et al. | |

FOREIGN PATENT DOCUMENTS

| | | |
|---|---|---|
| EP | 1 054 541 | 11/2000 |
| JP | A-08-191333 | 7/1996 |

(Continued)

OTHER PUBLICATIONS

Sawada, M., Okada, H., Yamazato, T., Katayama, M.; A study on the mitigation of the influence of ADC nonlinearity in an OFDM receiver; *The 28th Symposium on Information Theory and Its Applications*, Onna, Okinawa, Japan, Nov. 20-23, 2005.

(Continued)

*Primary Examiner*—Betsy L Deppe
(74) *Attorney, Agent, or Firm*—Posz Law Group, PLC

(57) ABSTRACT

A method for correcting a soft decision value includes: demodulating a reception signal, which is coded by an error correction code and modulated in order to represent one or multiple bits with one symbol; generating the soft decision value, which is used in decoding of the error correction code; multiplying the soft decision value by a weight factor to correct the soft decision value; estimating an amplitude of the reception signal in every predetermined measurement time period; and variably setting the weight factor in a symbol unit in accordance with an estimating result so that a corrected soft decision value approaches to a predetermined amplitude range.

10 Claims, 8 Drawing Sheets

FOREIGN PATENT DOCUMENTS

JP  A-2000-228657  8/2000

OTHER PUBLICATIONS

Sawada, M., Okada, H., Yamazato, T., Katayama, M.; Influence of the Signal Level at ADC-input on the Performance of an OFDM Receiver; *The 27th Symposium on Information Theory and Its Applications*, Gero, Gifu, Japan, Dec. 14-17, 2004.

Sawada, M., Okada, H., Yamazato, T., Katayama, M.; Influence of the Nonlinearity of the ADC in an OFDM Receiver; *10th International OFDM-Workshop 2005*, Hamburg.

Sawada, M., Okada, H., Yamazato, T., Katayama, M.; A study on the mitigation of the influence of ADC nonlinearity in an OFDM receiver; *The 28th Symposium on Information Theory and Its Applications*, Onna, Okinawa, Japan, Nov. 20-23, 2005. (with English abstract).

Sawada, M., Okada, H., Yamazato, T., Katayama, M.; Influence of the Signal Level at ADC-input on the Performance of an OFDM Receiver; *The 27th Symposium on Information Theory and Its Applications*, Gero, Gifu, Japan, Dec. 14-17, 2004. (with English abstract).

Office Action dated Dec. 11, 2008 in corresponding German patent application No. 10 2006 053 960.5-31 (and English translation).

Office Action issued from the German Patent Office on Jul. 28, 2009 in the corresponding German patent application No. 10 2006 053 960.5-31 (with English translation).

\* cited by examiner

| LEVEL | WEIGHT |
|---|---|
| I1 | $\gamma 1$ |
| I2 | $\gamma 2$ |
| I3 | $\gamma 3$ |
| ⋮ | ⋮ |
| Ix | $\gamma x$ |
| ⋮ | ⋮ |

METHOD FOR CORRECTING SOFT DECISION VALUE, COMPUTER PROGRAM PRODUCT FOR THE SAME, AND RECEPTION APPARATUS FOR THE SAME

CROSS REFERENCE TO RELATED APPLICATION

This application is based on Japanese Patent Application No. 2005-334221 filed on Nov. 18, 2005, the disclosure of which is incorporated herein by reference.

FIELD OF THE INVENTION

The present invention relates to a method for correcting a soft decision value, a computer program product for the same, and a reception apparatus for the same.

BACKGROUND OF THE INVENTION

In radio communications, a signal attenuates greatly in the propagation path between a transmitter and a receiver, and the characteristics of the propagation path fluctuate greatly. Therefore, it has heretofore been performed to dispose an automatic gain control (AGC) amplifier in a reception apparatus and to control a reception signal to an amplitude suitable for a signal processing circuit at the succeeding stage, or to employ an error correction code capable of correcting the error of data, as a transmission code.

Especially, a scheme which employs a convolution code as the error correction code and which performs the maximum-likelihood decoding by Viterbi decoding has a high error correction ability and is utilized in various fields.

Besides, in the Viterbi decoding, the state transition of a decoder is estimated from a reception series, and the most probable (maximum-likelihood) state transition is selected so as to estimate a transmitted information series. On this occasion, the Hamming distance between a received code and a candidate code is generally employed as a likelihood for numerically representing the probable-ness of the state transition. Here, in evaluating the likelihood, there have been known a hard decision which represents the received code by either of binary values "0" and "1", and a soft decision which represents the received code by any of multiple values corresponding to the amplitude of the reception signal. In recent years, the soft decision of higher error correction ability has been adopted more and more. Hereinbelow, a value which represents the likelihood in the soft decision shall be called "soft decision value".

Meanwhile, in the reception apparatus of this type, the reception signal is sampled by an A/D converter, and signal processing is executed using the resulting sampling values. It has been known that, in a case where the amplitude of the input signal to the A/D converter is not an appropriate magnitude (for example, in a case where the gain control of the AGC amplifier is not appropriately performed for any reason), a characteristic degradation ascribable to the nonlinearity of the A/D converter occurs (refer to, for example, Manabu Sawada, Hiraku Okada, Takaya Yamazato, Masaaki Katayama: "Influence of the Nonlinearity of the ADC in an OFDM Receiver", Collection of Preliminary documents of the 10th International Workshop 2005, Hamburg, 2005. 8, p. 220-p. 224).

More specifically, as shown by a conversion characteristic in FIG. 3, the A/D converter has the properties that a continuous analog signal is converted into discrete digital data, and that a signal exceeding an input full scale range is clipped to the maximum value or minimum value of the digital data. In addition, in a case where the amplitude of the input signal of the A/D converter is too small, only part of the input full scale range of the A/D converter is used, and the number of significant bits (resolution) for the input signal is not sufficiently ensured, so that the A/D conversion data contain large quantization errors. To the contrary, in a case where the amplitude of the input signal of the A/D converter is too large, the signal having exceeded the input full scale range of the A/D converter is clipped to incur a waveform distortion. In either case, the characteristic degradation occurs.

Besides, in recent years, the radio communications have been enlarged in capacity, and orthogonal frequency division multiplexing (OFDM) has been known as one of typical transmission schemes for realizing the large-capacity communications.

In the OFDM, information items are respectively carried on a large number of subcarriers of different frequencies, and the resulting subcarriers are multiplexed and transmitted. Therefore, a transmission signal (termed "multicarrier signal") into which the signals of the individual subcarriers are combined comes to have a very large amplitude (peak power) when the phases of the signals of the individual subcarriers have agreed, and it becomes a signal whose peak to average power ratio (PAPR) is large.

For this reason, in a case where the AGC amplifier is disposed in the reception apparatus adopting the OFDM, the gain of the AGC amplifier (in turn, the amplitude of the input signal to the A/D converter) will not be appropriately controlled at a higher possibility than in the case of a single-carrier signal which is generally employed, with the result that the characteristic degradation ascribable to the nonlinearity of the A/D converter as stated above will occur at a higher possibility.

On the other hand, there has been disclosed a reception apparatus wherein the instantaneous reception amplitude of the reception signal is detected, and the soft decision value for use in the error correction decoding is multiplied by a weighting factor dependent upon the instantaneous reception amplitude of the reception signal, thereby to correct the soft decision value, and wherein the decoding is performed using the corrected soft decision value (refer to, for example, JP-A-H5-315977).

In the conventional apparatus, however, the weighting factors are set so as to obtain the soft decision value whose likelihood of the state transition is low, under the assumption that the reliability of the reception signal will be low (an error will be contained at a high possibility) whenever the instantaneous reception amplitude is small. Therefore, even in a case, for example, where merely the amplitude is small and where the signal hardly undergoes the influence of noise, or where the amplitude becomes too small because the gain control of the AGC amplifier is not appropriately performed, the reliability of the reception signal is judged to be low. This has posed the problem that the reception signal from which correct information can be extracted only if appropriately amplified is not effectively utilized.

Besides, as stated above, the characteristic degradation occurs, not only when the amplitude is too small, but also when the amplitude is too large. In this regard, the prior-art apparatus has had the problem that only the too small amplitude is coped with, and that the too large amplitude cannot be coped with.

Further, the prior-art apparatus has had the problem that, since the weighting factor is set in accordance with the instantaneous reception amplitude, it is liable to be governed by chance, so an inappropriate weighting factor which is under the influence of noise by way of example is liable to be set.

SUMMARY OF THE INVENTION

In view of the above-described problem, it is an object of the present disclosure to provide a soft-decision-value correction method. It is another object of the present disclosure to provide a computer program product of a soft-decision-value correction method. It is further another object of the present disclosure to provide a reception apparatus by utilizing a soft-decision-value correction method.

According to a first aspect of the resent disclosure, a method for correcting a soft decision value includes: demodulating a reception signal, which is coded by an error correction code and modulated in order to represent one or multiple bits with one symbol; generating the soft decision value, which is used in decoding of the error correction code; multiplying the soft decision value by a weight factor so that the soft decision value is corrected; estimating an amplitude of the reception signal in every predetermined measurement time period; and variably setting the weight factor in a symbol unit in accordance with an estimating result in estimating the amplitude so that a corrected soft decision value after correcting the soft decision value approaches to a predetermined amplitude range.

In the above method, it is possible to suppress a characteristic degradation ascribable to the fact that the amplitude of the reception signal is too small or too large. Further, the influence of an instantaneous abnormal value ascribable to noise or the like can be suppressed more than in a prior-art apparatus which sets a weight factor in accordance with an instantaneous reception amplitude. As a result, the weight factor of high reliability can be set, and the soft decision value of high precision can be consequently obtained.

According to a second aspect of the present disclosure, a computer program product in a computer readable medium for correcting a soft decision value includes: an instruction for demodulating the reception signal, which is coded by an error correction code and modulated in order to represent one or multiple bits with one symbol; an instruction for generating the soft decision value, which is used in decoding of the error correction code; an instruction for multiplying the soft decision value by a weight factor so that the soft decision value is corrected; an instruction for estimating an amplitude of the reception signal in every predetermined measurement time period; and an instruction for variably setting the weight factor in a symbol unit in accordance with an estimating result in estimating the amplitude so that a corrected soft decision value after correcting the soft decision value approaches to a predetermined amplitude range.

In this case, it is possible to suppress a characteristic degradation ascribable to the fact that the amplitude of the reception signal is too small or too large. Further, the influence of an instantaneous abnormal value ascribable to noise or the like can be suppressed more than in a prior-art apparatus which sets a weight factor in accordance with an instantaneous reception amplitude. As a result, the weight factor of high reliability can be set, and the soft decision value of high precision can be consequently obtained.

According to a third aspect of the present disclosure, a reception apparatus includes: a demodulating element for demodulating a reception signal, which is coded by an error correction code and modulated in order to represent one or multiple bits with one symbol, and for generating the soft decision value, which is used in decoding of the error correction code; a multiplying element for multiplying the soft decision value by a weight factor so that the soft decision value is corrected; an estimating element for estimating an amplitude of the reception signal in every predetermined measurement time period; and a setting element for variably setting the weight factor in a symbol unit in accordance with an estimating result in estimating the amplitude so that a corrected soft decision value after correcting the soft decision value approaches to a predetermined amplitude range.

In the above reception apparatus, the reception apparatus can attain to suppress a characteristic degradation ascribable to the fact that the amplitude of the reception signal is too small or too large. Besides, the influence of an instantaneous abnormal value ascribable to noise or the like can be suppressed more than in a prior-art apparatus which sets a weight factor in accordance with an instantaneous reception amplitude. As a result, the weight factor of high reliability can be set, and the soft decision value of high precision can be consequently obtained.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
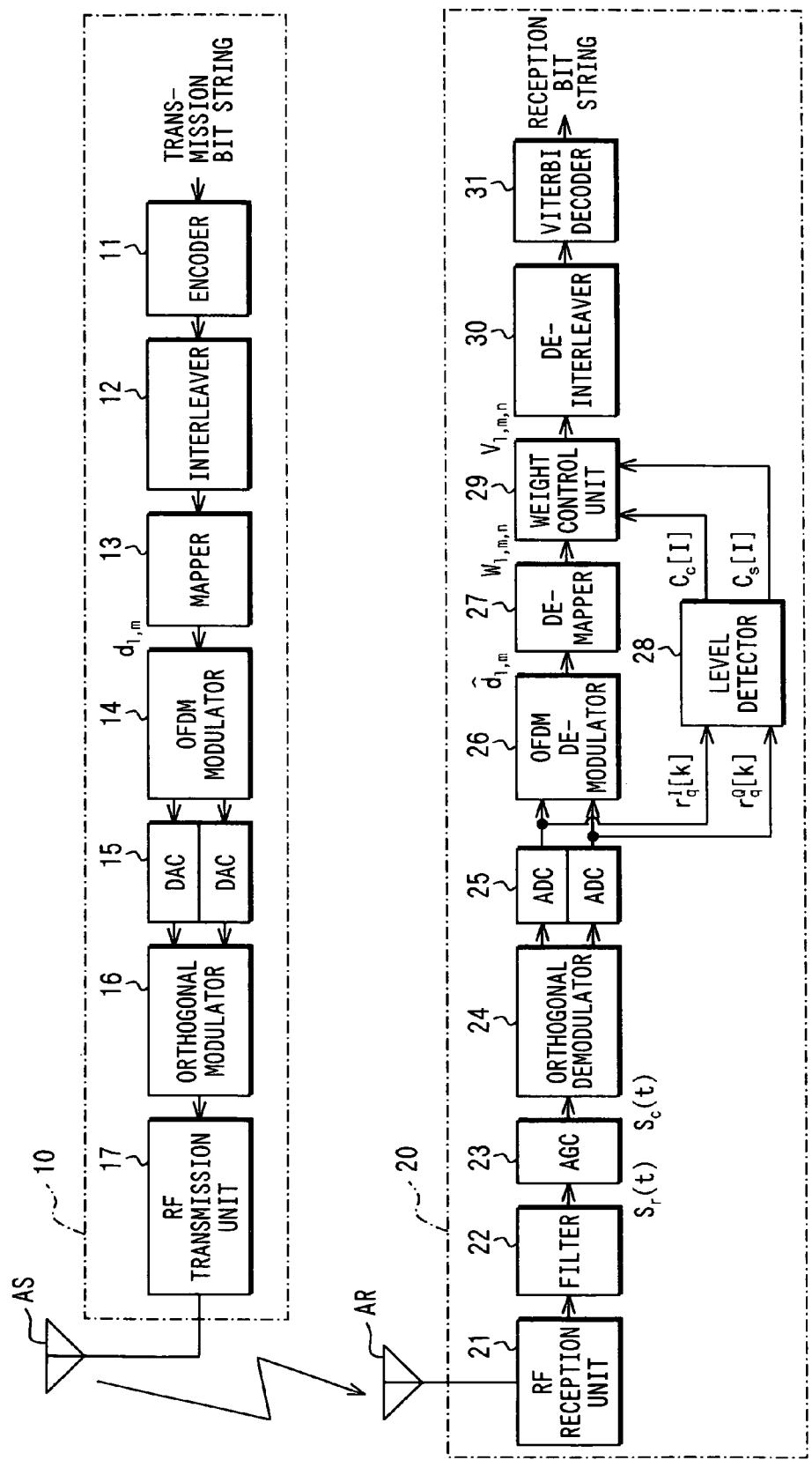
FIG. 1 is a block diagram showing a transmission apparatus and a reception apparatus in a communication system.

FIG. 1 is a block diagram showing the schematic configurations of a transmission apparatus and a reception apparatus, which constitute a communication system.

As shown in FIG. 1, the transmission apparatus 10 includes an encoder 11 which encodes a transmission bit string into error correction codes (here, convolution codes), an interleaver 12 which changes (as an interleave process) the sequence of a code string outputted from the encoder 11, a mapper 13 which maps the output of the interleaver 12 into symbol points of $2^N$ QAM every N bits, an OFDM modulator 14 which subjects the output (hereinbelow, termed "primary modulation symbol") d of the mapper 13 to an inverse FFT transform in correspondence with M (denoting an integer of at least 2) subcarriers for use in orthogonal frequency demultiplexing (OFDM) as will be explained later, thereby to generate two data strings representing the I component and Q component of an OFDM symbol (hereinbelow, also termed "secondary modulation symbol"), D/A converters 15 which subject the two data strings generated by the OFDM modulator 14, to digital-to-analog conversions, respectively, thereby to generate two baseband signals representing the I component and the Q component, an orthogonal modulator 16 which generates a transmission signal by mixing the two baseband signals generated by the D/A converters 15, and an RF transmission unit 17 which up-converts the transmission signal generated by the orthogonal modulator 16, into a signal of preset frequency band and which transmits the up-converted signal through a transmission antenna AS.

On the other hand, the reception apparatus 20 includes an RF reception unit 21 which receives the signal transmitted from the transmission apparatus 10, through a reception antenna AR and which down-converts the received signal into a signal of frequency band suitable for signal processing, a filter 22 which removes unnecessary frequency components from the output of the RF reception unit 21, an automatic gain control (AGC) amplifier 23 which amplifies a reception signal outputted from the filter 22, while automatically adjusting a gain in order that mean power may agree with a preset target value, an orthogonal demodulator 24 which generates two baseband signals representing the I component and the Q component, from the reception signal amplified by the AGC amplifier 23, and A/D converters 25 which sample the two baseband signals generated by the orthogonal demodulator 24, respectively, thereby to generate two data strings representing the I component and the Q component.

Besides, the reception apparatus 20 includes an OFDM demodulator 26 which subjects the two data strings generated by the A/D converters 25, to an FFT transform, thereby to demodulate the two data strings into the primary modulation symbol corresponding to the M subcarriers, a demapper 27 which generates a soft decision value of n bits on the basis of the primary modulation symbol demodulated by the OFDM demodulator 26, a level detector 28 which generates estimative values for estimating the reception level of the reception signal, on the basis of the two data strings generated by the A/D converters 25, a weight control unit 29 which sets weighting factors on the basis of the estimative values generated by the level detector 28, and which multiplies the soft decision value generated by the demapper 27, by the respective weighting factors, thereby to generate a code string formed of the corrected soft decision value, a deinterleaver 30 which changes the sequence of the code string generated by the weight control unit 29, into the original sequence, and a Viterbi decoder 31 which generates a reception bit string by executing maximum-likelihood decoding on the basis of the output of the deinterleaver 30. In FIG. 1, AR represents a reception antenna.

By the way, in this embodiment, the encoder 11, interleaver 12, mapper 13 and OFDM demodulator 14 of the transmission apparatus 10, and the OFDM demodulator 26, demapper 27, level detector 28, weight control unit 29, deinterleaver 30 and Viterbi decoder 31 of the reception apparatus 20 are incarnated as processes which a microcomputer executes in conformity with programs prepared beforehand.

Besides, the interleaver 12 and the deinterleaver 30 are configured so as to execute "interleave" and "deinterleave" which extend over the OFDM symbol.

Here, letting T denote the symbol time period of the OFDM symbol, p(t) denote a pulse waveform which is defined by Formula No. 1, and $d_{l,m}$ denote the primary modulation symbol for the m-th subcarrier (m=-M/2, -(M/2)+1, . . . , and (M/2)-1) in the first OFDM symbol, the transmission signal $S_s(t)$ which the transmission apparatus 10 transmits is represented by Formula No. 2.

$$p(t) = \begin{cases} 1 & 0 \le t < T \\ 0 & \text{otherwise} \end{cases} \tag{F1}$$

$$S_s(t) = \sum_{l=-\infty}^{\infty} \sum_{m=-\frac{M}{2}}^{\frac{M}{2}-1} d_{l,m} \exp\left\{j2\pi \frac{m}{T}(t-lT)\right\} p(t-lT) \tag{F2}$$

Besides, letting $h(\tau)$ denote the impulse response of the propagation path between the transmission apparatus 10 and the reception apparatus 20, $f(\tau)$ denote the impulse response of the filter 22 (ideal rectangular filter), and n(t) denote noise (random variable of mean 0 and variance $\sigma_k^2$) which has been added in the propagation path and whose band has been limited by the filter 22, the reception signal $S_r(t)$ whose band has been limited by the filter 22 is represented by Formula No. 3. Here, the noise added in the propagation path is assumed to be white Gaussian noise whose double-side spectral density is N0/2.

$$S_r(t)=f(t)*h(t)*S_s(t)+n(t) \tag{F3}$$

Incidentally, symbol * in the formula indicates a convolution operation.

Besides, letting g(t) denote the gain of the AGC amplifier 23, the reception signal $S_c(t)$ amplified by the AGC amplifier 23 is represented by Formula F4.

$$S_c=g(t)S_r(t) \tag{F4}$$

Letting Re[$S_c(t)$] denote the baseband signal representing the I component which has been generated by subjecting the amplified reception signal $S_c(t)$ to orthogonal demodulation by the orthogonal demodulator 24, Im[$S_c(t)$] denote the baseband signal representing the Q component, and $T_s$ denote a sampling interval in the A/D converters 25, the kth data $r^I_q[k]$ obtained by the sampling of the baseband signal Re[$S_c(t)$] by the A/D converter 25 is represented by Formula No. 5, and the kth data $r^Q_q[k]$ obtained by the sampling of the baseband signal Im[$S_c(t)$] is represented by Formula No. 6.

$$r^I_q[k]=q(Re[S_c(kT_s)]) \tag{F5}$$

$$r^Q_q[k]=q(Im[S_c(kT_s)]) \tag{F6}$$

Figure 3:
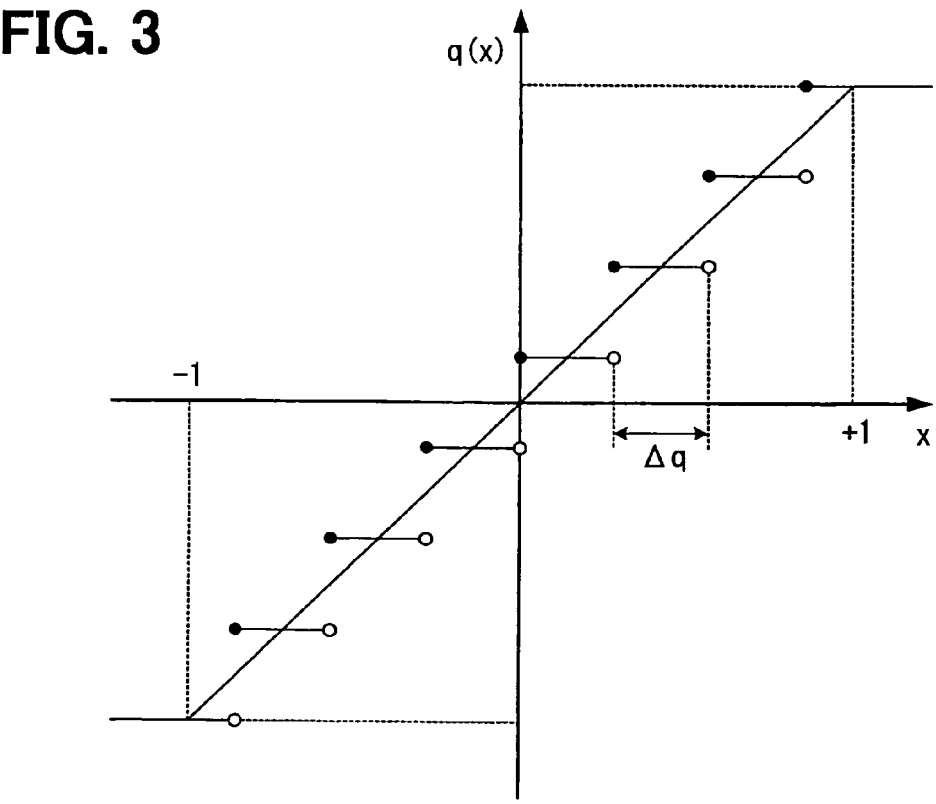
FIG. 3 is a graph showing characteristics of an A/D converter.

Incidentally, q(x) denotes a function which represents the input/output characteristic of the A/D converters 25, and which is defined by Formula No. 7 and has the characteristic represented by a graph shown in FIG. 3.

$$q(x) = \begin{cases} 1 & x \ge 1 \\ \lfloor x/\Delta_q \rfloor \; \Delta_q + \frac{\Delta_q}{2} & -1 \le x < 1 \\ -1 & x < -1 \end{cases} \tag{F7}$$

Here, [x] denotes the maximum integer which does not exceed x, and $\Delta q$ denotes a quantization width.

When $\hat{d}_{l,m}$ is let denote the primary modulation symbol corresponding to the mth subcarrier in the first OFDM symbol which the OFDM demodulator 26 has demodulated on the basis of the data strings obtained by sampling these baseband signals, the soft decision value $w_{l,m,n}$ of the nth bit contained in the primary modulation symbol $\hat{d}_{l,m}$ is calculated in the demapper 27, in conformity with the following formulas:

$$W_{l,m,n} = \begin{cases} \text{Re}[\hat{d}_{l,m}] & n = 1 \\ \text{Im}[\hat{d}_{l,m}] & n = 2 \end{cases} \quad \text{(F8)}$$

$$W_{l,m,n} = \begin{cases} \text{Re}[\hat{d}_{l,m}] & n = 1 \\ -(\text{Re}[\hat{d}_{l,m}] - A) & n = 2 \\ \text{Im}[\hat{d}_{l,m}] & n = 3 \\ -(\text{Im}[\hat{d}_{l,m}] - A) & n = 4 \end{cases} \quad \text{(F9)}$$

In Formula No. 9, letter A denotes a threshold value which is set on the basis of the amplitude of the subcarrier every subcarrier.

Figure 4A:
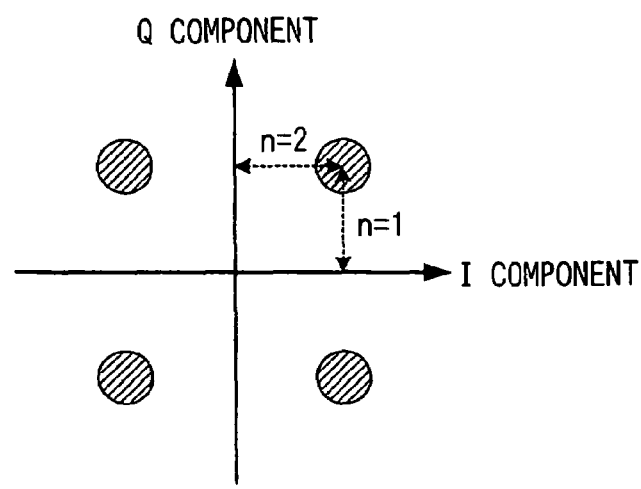
FIGS. 4A and 4B are graphs explaining symbols of QPSK and 16-QAM.
Figure 4B:
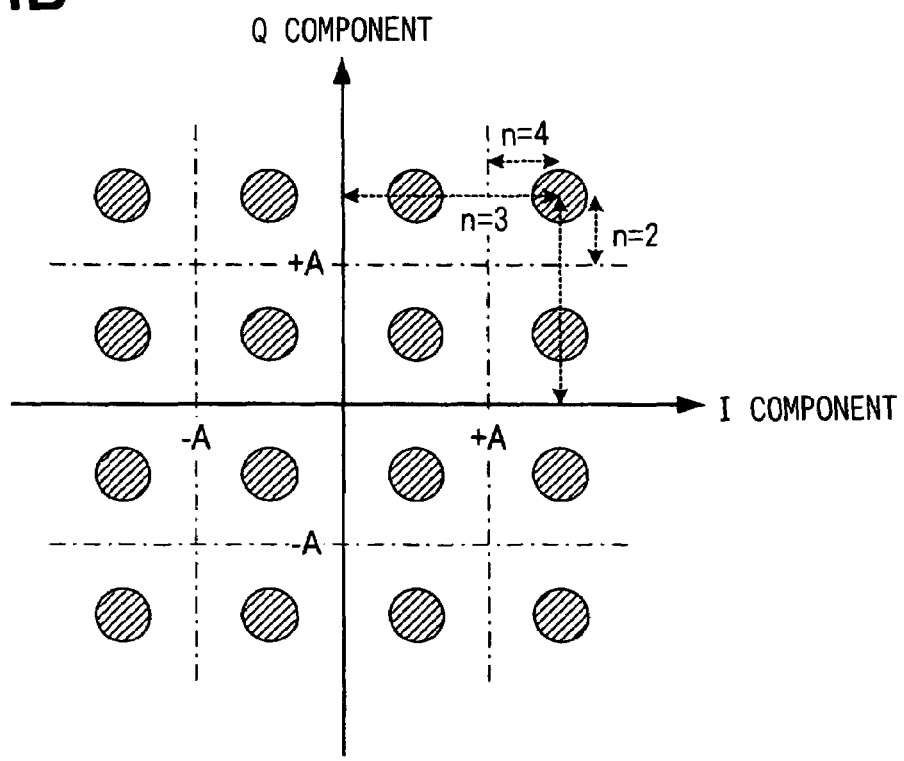

Here, Formula No. 8 corresponds to a case (refer to FIG. 4A) where QPSK (for N=2) is employed for the generation of the primary modulation symbol (the modulation of the subcarrier), while Formula No. 9 corresponds to a case (refer to FIG. 4B) where 16 QAM (for N=4) is employed, and the other cases (cases other than those of N=2 and 4) are easily conjecturable from these formulas. Besides, the calculation method for the soft decision value is not restricted to the above formulas, but any known method may be adopted.

Figure 2:
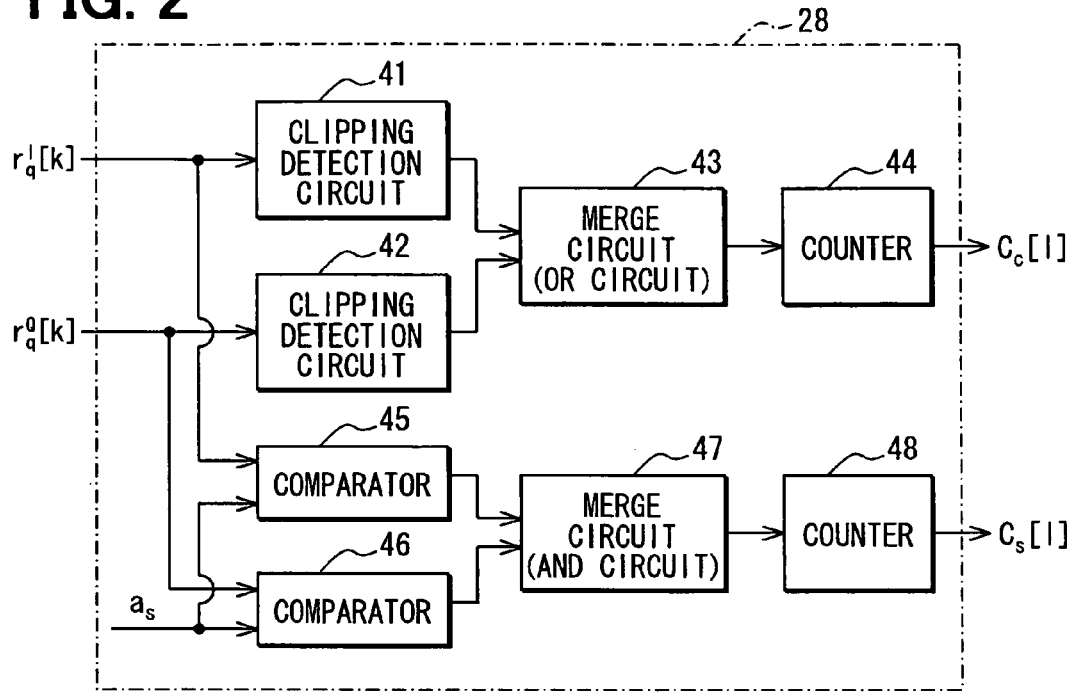
FIG. 2 is a block diagram showing a level detector in the system.

Now, FIG. 2 is a block diagram showing the configuration of the level detector 28.

As shown in FIG. 2, the level detector 28 includes a clipping detection circuit 41 which detects whether or not the data $r^I_q[k]$ representing the I component generated by the A/D converter 25 has been clipped to the maximum value of the output range of the A/D converter 25 (or has reached a "too large" threshold value, a clipping detection circuit 42 which similarly detects whether or not the data $r^Q_q[k]$ representing the Q component generated by the A/D converter 25 has been clipped to the maximum value of the output range of the A/D converter 25, a merge circuit 43 which outputs a pulse signal in a case where the clipping has been detected in at least one of both the clipping detection circuits 41 and 42, and a counter 44 which counts the pulse signals outputted from the merge circuit 43, in units of the respective OFDM symbols, and which outputs the count value as a "too large" estimative value $C_c[1]$. Specifically, the counter 44 relates to overestimation determination.

Besides, the level detector 28 includes a comparator 45 which compares the data $r^I_q[k]$ and a preset "too small" threshold value $a_s$, a comparator 46 which compares the data $r^Q_q[k]$ and the "too small" threshold value $a_s$, a merge circuit 47 which outputs a pulse signal in a case where both the comparators 45 and 46 have decided that the data are smaller than the "too small" threshold value $a_s$, and a counter 48 which counts the pulse signals outputted from the merge circuit 47 in units of the respective OFDM symbols and which outputs the count value as a "too small" estimative value $C_s[1]$. Specifically, the counter 48 relates to underestimation determination.

That is, when the number of samples to one OFDM symbol (symbol time period T) in the A/D converters 25 is denoted by $K_s$ (=T/$T_s$), the output $e_c[k]$ of the merge circuit 43 is represented by Formula No. 10, and the output $e_s[k]$ of the merge circuit 47 is represented by Formula No. 11.

$$e_c[k] = \begin{cases} 1 & |r^I_q[k]| = 1 \text{ or } |r^Q_q[k]| = 1 \\ 0 & \text{otherwise} \end{cases} \quad \text{(F10)}$$

-continued $$e_s[k] = \begin{cases} 1 & |r^I_q[k]| < a_s \text{ and } |r^Q_q[k]| < a_s \\ 0 & \text{otherwise} \end{cases} \quad \text{(F11)}$$

Here, it is assumed that the data $r^I_q[k]$ and $r^Q_q[k]$ are normalized so that the maximum value of the output ranges of the A/D converters 25 may become 1 (one). Besides, the number of samples, $K_s$ is set to be P times (P being a positive integer of at least 2) the number of samples as is, at least, required in the process (FFT) of the OFDM demodulator 26. That is, the A/D converters 25 are set so as to perform so-called "oversampling".

Besides, the "too large" estimative value $C_c[1]$ being the output of the counter 44 is represented by Formula No. 12, and the "too small" estimative value $C_s[1]$ being the output of the counter 48 is represented by Formula No. 13.

$$C_c[l] = \sum_{k=0}^{K_s-1} e_c[k + lK_s] \quad \text{(12)}$$

$$C_s[l] = \sum_{k=0}^{K_s-1} e_s[k + lK_s] \quad \text{(13)}$$

Next, the weight control unit 29 executes a process indicated by Formula No. 14, for all the soft decision values $w_{l,m,n}$ generated from the first OFDM symbol.

$$v_{l,m,n} = \begin{cases} \gamma_c \cdot w_{l,m,n} & C_c[l] \geq th_c \\ \gamma_s \cdot w_{l,m,n} & C_s[l] \geq th_s \\ w_{l,m,n} & \text{otherwise} \end{cases} \quad \text{(F14)}$$

That is, in a case where the "too large" estimative value $C_c[1]$ generated by the level detector 28 is equal to or larger than a preset "too large" decision value $th_c$, the soft decision value $w_{l,m,n}$ generated by the demapper 27 is multiplied by a weighting factor $\gamma_c$, thereby to set a corrected soft decision value $v_{l,m,n}$. Besides, in a case where the "too small" estimative value $C_s[1]$ generated by the level detector 28 is equal to or larger than a preset "too small" decision value $th_s$, the soft decision value $w_{l,m,n}$ generated by the demapper 27 is multiplied by a weighting factor $\gamma_s$, thereby to set a corrected soft decision value $v_{l,m,n}$. Further, in any other case, the soft decision value $w_{l,m,n}$ generated by the demapper 27 is directly set as a corrected soft decision value $v_{l,m,n}$.

Incidentally, the decision values $th_c$ and $th_s$, and the weighting factors $\gamma_c$ and $\gamma_s$ are constants which are set on the basis of experiments. Besides, the case of $\gamma_c=\gamma_s=1$ corresponds to the prior-art apparatus in which the soft decision value is not corrected.

The corrected soft decision value $v_{l,m,n}$ is deinterleaved by the deinterleaver 30, and is thereafter inputted to the Viterbi decoder 31 so as to be decoded into the reception bit string.

Here, in order to assess the effectiveness of the communication system of this embodiment, results obtained by calculating reception bit error rate (BER) characteristics by computer simulations will be indicated.

As the conditions of the simulations, an "interleave" size in the interleaver 12 and the deinterleaver 30 was 5, a modulation/demodulation format used in the mapper 13 and the demapper 27 was QPSK (=22 QAM), the number of subcarriers was N=64, the number of samples to the OFDM symbol in the A/D converters 25 was $K_s$=256 (quadruple oversampling), the number of quantization bits was 8, the ratio of a noise power density to the energy of one bit of transmission information was Eb/NO=6 dB, the characteristic of a propagation path was h(τ)=1, and symbol synchronization was assumed to be in an ideal state.

Figure 5:
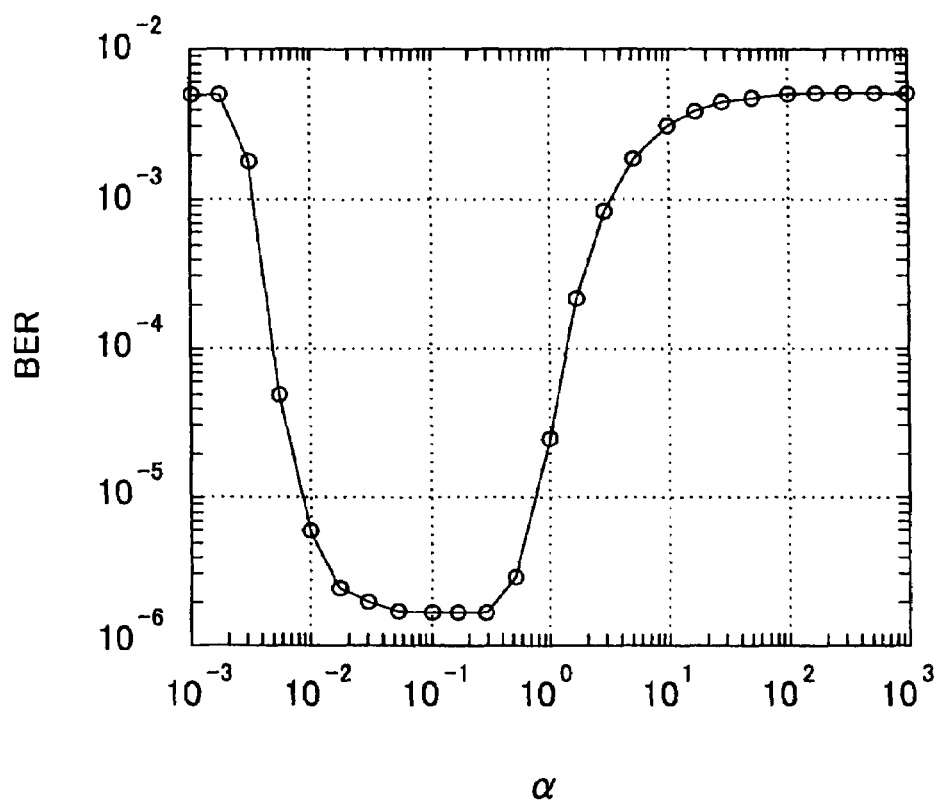
FIG. 5 is a graph showing a simulation result of BER characteristics with respect to gain.

First, FIG. 5 is a graph showing the result in which the BER characteristic was evaluated versus the gains α of the AGC amplifier 23 when the gains were fixed gains (g(t)=α).

It is seen from FIG. 5 that characteristic degradations are observed in the region of the large value of the gain α where the inputs of the A/D converters 25 become too large, and in the region of the small value of the gain α where the inputs of the A/D converters 25 become too small, and that the optimum region of good characteristic (a range of about 10 dB centering round the vicinity of α=0.1) exists between the degrading regions.

That is, in a case where the gain control of the AGC amplifier 23 has not been performed for any reason and where it has deviated from the optimum region, the inputs to the A/D converters 25 become too large or too small, to incur the characteristic degradations. Incidentally, as causes for the deviations of the gain control from the optimum region, there are considered a case where the optimum region has greatly changed with the abrupt change of the propagation path characteristic, a case where signals of large or small amplitudes have been inputted in temporarily concentrative fashion, and so forth.

Figure 6:
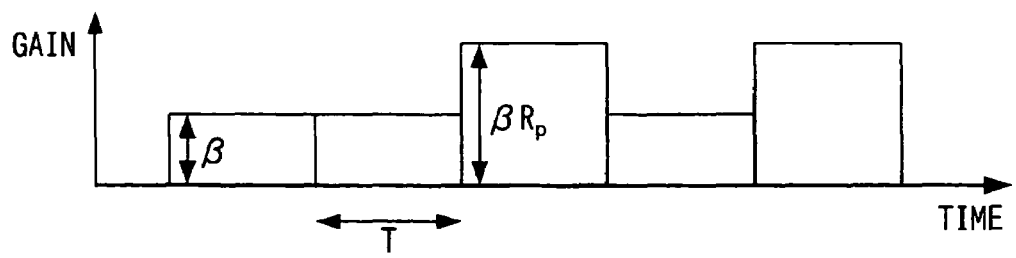
FIG. 6 is a graph explaining a control model of an AGC amplifier.

FIG. 6 simulates a situation where the gain of the AGC amplifier 23 fluctuates at random in OFDM symbol (time period T) units. It indicates that the gain g(t) of the AGC amplifier 23 becomes g(t)=β at a probability (1−Pe), and g(t)=Rp×β at a probability Pe.

Figure 7:
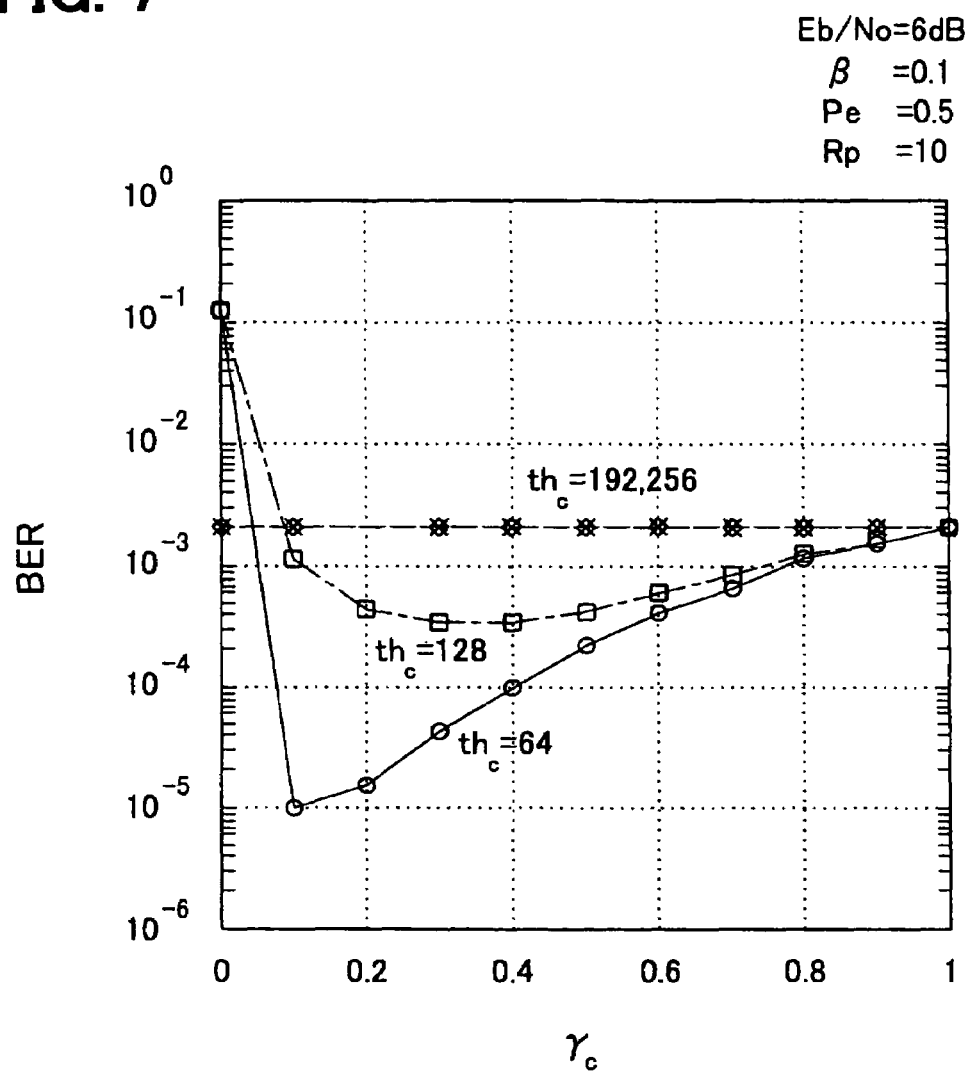
FIG. 7 is a graph showing a simulation result of BER characteristics with respect to a weighting factor in case of "too large" amplitude.

In addition, FIG. 7 shows the BER characteristic in the case where β=0.1, Pe=0.5 and Rp=10 were assumed, that is, the control mistake of the "too large" amplitude (g(t)=1) was assumed to occur at a probability of ½ in the AGC amplifier 23, with parameters being the weighting factor $\gamma_c$ and the "too large" decision value $th_c$.

Figure 8:
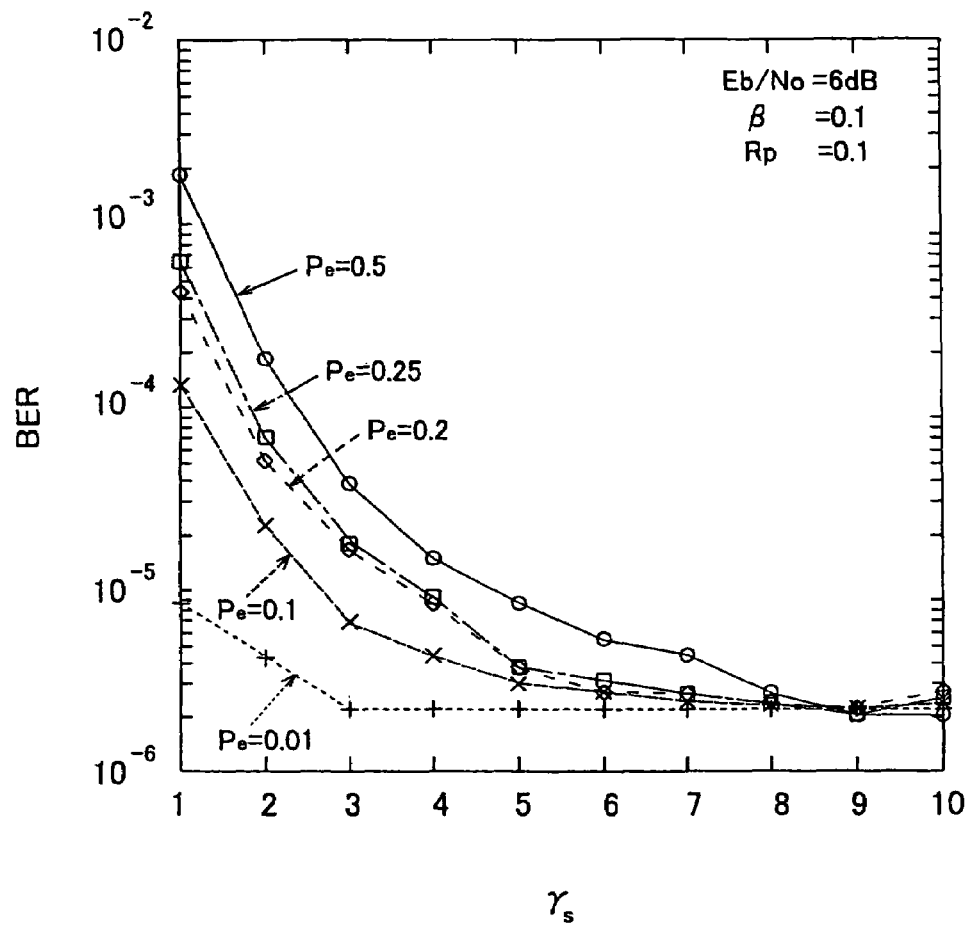
FIG. 8 is a graph showing a simulation result of BER characteristics with respect to a weighting factor in case of "too small" amplitude.

Besides, FIG. 8 shows the BER characteristic in the case where symbols becoming too small were known when β=0.1, Rp=0.1 and an ideal "too small" decision were assumed, that is, the control mistake of the "too small" amplitude (g(t)=0.01) was assumed to occur at a probability of Pe in the AGC amplifier 23, with parameters being the probability Pe and the weighting factor $\gamma_s$.

Incidentally, as stated before, the case of $\gamma_c$=1 in the graph of FIG. 7 and the case of $\gamma_s$=1 in the graph of FIG. 8 correspond to the characteristic of the prior-art apparatus which does not perform the weight control.

It is seen from FIG. 7 that, when the "too large" decision value $th_c$ and the weighting factor $\gamma_c$ are appropriately selected, the BER characteristic of the reception apparatus 20 is improved much more than in the prior-art apparatus. However, in a case where the "too large" decision value th, is made excessively large (here, $th_c \geq K_s \times \frac{3}{4}$), the effect of the characteristic improvement is not observed.

It is seen from FIG. 8 that the BER characteristic of the reception apparatus 20 is improved more than in the prior-art apparatus, irrespective of the probability Pe at which the control mistake occurs.

Incidentally, in the case where the QPSK is adopted as the subcarrier modulation as in the above simulations, it is understood that, regarding the weighting factors for the soft decision value $w_{l,m,n}$ as are set in conformity with Formula No. 8, the characteristic is improved by setting the weighting factor $\gamma_c$ for the "too large" amplitude at a value which is larger than 0 and smaller than 1, and the weighting factor $\gamma_s$ for the "too small" amplitude at a value which is larger than 1.

That is, even in the case where the amplitude is "too large" or "too small", the characteristic degradation ascribable to the fact that the amplitude of the baseband signal is too small or too large can be relieved by setting the weighting factor $\gamma_c$ or $\gamma_s$ at the appropriate value.

Besides, in the communication system of this embodiment, the estimative values $C_c[1]$ and $C_s[1]$ for use in the settings of the weighting factors $\gamma_c$ and $\gamma_s$ are respectively set on the basis of the sampling values $r^I_q[k]$ and $r^Q_q[k]$ of the baseband signals which are repeatedly detected during the OFDM symbol time period T.

For this reason, the influence of an instantaneous abnormal value due to noise or the like can be suppressed more than in a case where weighting factors are set in accordance with instantaneous reception amplitudes. As a result, weighting factors of high reliability can be set, and a soft decision value of high precision can be consequently obtained.

Moreover, in the communication system of this embodiment, even in the case where any control mistake has occurred in the AGC amplifier 23 (the gain control is not appropriately proceeding), the control mistake is compensated in the weight control unit 29 at the succeeding stage. It is therefore possible to relax a required precision for the control precision of the AGC amplifier 23, or to expand an AGC follow-up range as the whole system.

Stated conversely, insofar as the amplitude fluctuation range of the reception signals of the reception apparatus 20 lies within a range which can be compensated by the control of weighting factors, the reception signal 20 can perform reception of good quality even with a simple configuration in which the AGC amplifier 23 is omitted.

By way of example, in the embodiment, one decision value $th_c$ and one decision value $th_s$ have been respectively set for the estimative value $C_c[1]$ and the estimative value $C_s[1]$ so that each of the weighting factors $\gamma_c$ and $\gamma_s$ may have a single value. However, a plurality of decision values may well be set for each of the estimative values $C_c[1]$ and $C_s[1]$ so that each of the weighting factors $\gamma_c$ and $\gamma^-_s$ may have a plurality of values.

Figures 9A, 9B:
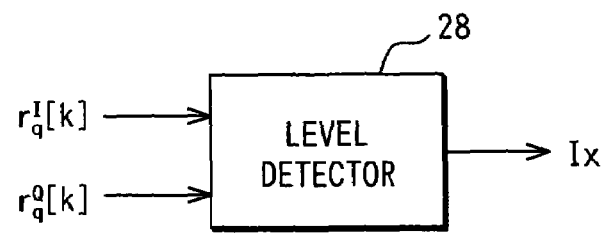
FIG. 9A is a block diagram showing another level detector in the system.
FIG. 9B is a table showing a relationship between a level and a weighting factor.

Besides, in the embodiment, the level detector 28 evaluates the number of times which the individual data $r^I_q[k]$ and $r^Q_q[k]$ have been the "too large" level or "too small" level as the estimative value $C_c[1]$ or $C_s[1]$ in OFDM symbol units, and the weight control unit 29 multiplies the soft decision value $w_{l,m,n}$ by the weighting factor $\gamma_c$ or $\gamma_s$, in the case where the estimative value $C_c[1]$ or $C_s[1]$ is equal to or larger than the corresponding preset decision value $th_c$ or $th_s$. By way of example, however, the level detector 28 may well calculate the mean amplitude of data in OFDM symbol units as shown in FIG. 9A, and the weight control-unit 29 may well set a weighting factor $\gamma_x$ in accordance with a table which is prepared beforehand, and in which signal levels (mean amplitudes) $I_x$ (x=1, 2, ...) and the weighting factors $\gamma_x$ corresponding to the levels are associated as shown in FIG. 9B. Specifically, the level detector 28 calculates an average level.

Figure 10:
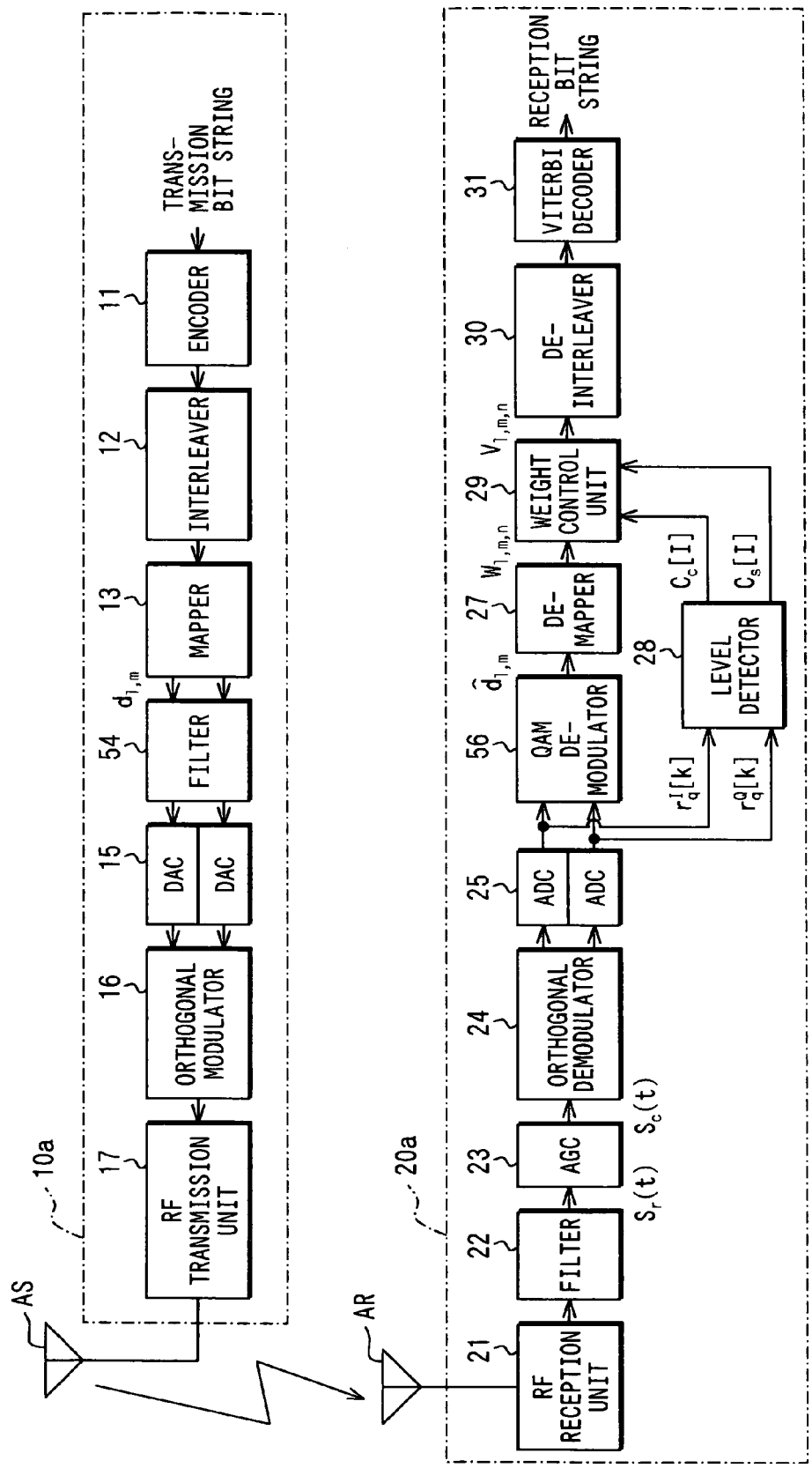
FIG. 10 is a block diagram showing a transmission apparatus and a reception apparatus in another communication system.

Besides, although the case of performing the transmission by the OFDM has been indicated in the embodiment, transmission may well be performed without employing the OFDM. In this case, as shown in FIG. 10, a transmission apparatus 10a is so configured that the primary modulation symbol (here, $2^N$ QAM symbol) generated by the mapper 13 is waveshaped by a filter 54 which is disposed instead of the OFDM modulator 14, whereupon the waveshaped symbol is fed to the D/A converters 15.

Besides, a reception apparatus 20a is so configured that data $r^I_q[k]$ and $r^Q_q[k]$ sampled by the A/D converters 25 are demodulated by a QAM demodulator 56 which is disposed instead of the OFDM demodulator 26, whereupon the output of the QAM demodulator 56 is fed to the demapper 27.

In the reception apparatus 20a, however, units in which the weighting factors are changed may be preset time interval Tcount units, not the OFDM symbol units.

Besides, the interleaver 12 of the transmission apparatus 10a or the deinterleaver 30 of the reception apparatus 20a may execute an interleave or deinterleave process in preset time interval Tint units, and for bits contained in the time interval Tint.

In the embodiment, the level detector 28 has used the outputs of the A/D converters 25, but it may well be configured so as to detect the signal levels of the analog signals at the stage preceding the A/D converters 25.

In the embodiment, when the amplitude is too large, the amplitude estimation means has estimated the amplitude on the basis of the number of clips contained in the symbol, as indicated in Formulas No. 10 and No. 12, but it may well be so configured that the amplitude is estimated on the basis of the number of samples having those amplitude values larger than a predetermined value a, which are contained in the symbol, as indicated in Formulas No. 15 and No. 16.

$$C_l[l] = \sum_{k=0}^{K_s-1} e_l[k + lK_s] \quad \text{(F15)}$$

$$e_l[k] = \begin{cases} 1 & |r^I_q[k]| > a_1 \text{ and } |r^Q_q[k]| > a_1 \\ 0 & \text{otherwise} \end{cases} \quad \text{(F16)}$$

Although the embodiment has been configured so as to perform the modulation by the $2^N$ QAM, this is not restrictive, but modulation may well be performed by $2^N$ PSK or the like.

The above disclosure has the following aspects.

According to a first aspect of the resent disclosure, a method for correcting a soft decision value includes: demodulating a reception signal, which is coded by an error correction code and modulated in order to represent one or multiple bits with one symbol; generating the soft decision value, which is used in decoding of the error correction code; multiplying the soft decision value by a weight factor so that the soft decision value is corrected; estimating an amplitude of the reception signal in every predetermined measurement time period; and variably setting the weight factor in a symbol unit in accordance with an estimating result in estimating the amplitude so that a corrected soft decision value after correcting the soft decision value approaches to a predetermined amplitude range.

The above soft-decision-value correction method may be applied to a reception apparatus having demodulation means for demodulating a reception signal which has been encoded by an error correction code and which has been modulated so as to represent one or more bits by one symbol, and for generating a soft decision value for use in the decoding of the error correction code. In addition, at a correction step, the soft decision value generated by the demodulation means is multiplied by a preset weighting factor, thereby to correct the soft decision value. Besides, at an amplitude estimation step, the amplitude of the reception signal is estimated on the basis of reception level detection means during a preset measurement time period, every measurement time period, and at a weighting-factor setting step, the weighting factor is variably set in symbol units in accordance with the result of the estimation at the amplitude estimation step so that the soft decision value after the correction by the correction step may approach to a characteristic corresponding to a preset appropriate amplitude range. Accordingly, according to the soft-decision-value correction method, it is possible to suppress a characteristic degradation ascribable to the fact that the amplitude of the reception signal is too small or too large. Besides, according to the soft-decision-value correction method, the amplitude of the reception signal is estimated on the basis of the reception levels which are repeatedly detected during the measurement time period, and the weighting factor is set in accordance with the result of the estimation. For this reason, the influence of an instantaneous abnormal value ascribable to noise or the like can be suppressed more than in a prior-art apparatus which sets a weighting factor in accordance with an instantaneous reception amplitude. As a result, the weighting factor of high reliability can be set, and the soft decision value of high precision can be consequently obtained.

Alternatively, since the weighting factor is variably set in symbol units, the measurement time period which is required for the detection of the reception levels for estimating the amplitude of the reception signal may desirably be set at a length equal to one symbol period. In this case, in a case where one symbol period is longer than a time period which is, at least, necessary for estimating the amplitude of the reception signal at a satisfactory precision (hereinbelow, the time period shall be termed the "necessary estimation time period"), the measurement time period may be shorter than one symbol period. To the contrary, in a case where one symbol period is shorter than the necessary estimation time period, the measurement time period may desirably be set integral times longer than one symbol period.

According to a second aspect of the present disclosure, a computer program product in a computer readable medium for correcting a soft decision value includes: an instruction for demodulating the reception signal, which is coded by an error correction code and modulated in order to represent one or multiple bits with one symbol; an instruction for generating the soft decision value, which is used in decoding of the error correction code; an instruction for multiplying the soft decision value by a weight factor so that the soft decision value is corrected; an instruction for estimating an amplitude of the reception signal in every predetermined measurement time period; and an instruction for variably setting the weight factor in a symbol unit in accordance with an estimating result in estimating the amplitude so that a corrected soft decision value after correcting the soft decision value approaches to a predetermined amplitude range.

As described above, the soft-decision-value correction method may well be incarnated as a program for causing a computer to execute the respective steps constituting the above method. In this case, the program may be stored in a computer-readable record medium so as to be loaded from the record medium into a computer system on occasion, or it may well be loaded into the computer system through a network. Besides, the record medium may be portable or may well be assembled in the computer system.

According to a third aspect of the present disclosure, a reception apparatus includes: a demodulating element for demodulating a reception signal, which is coded by an error correction code and modulated in order to represent one or multiple bits with one symbol, and for generating the soft decision value, which is used in decoding of the error correction code; a multiplying element for multiplying the soft decision value by a weight factor so that the soft decision value is corrected; an estimating element for estimating an amplitude of the reception signal in every predetermined measurement time period; and a setting element for variably setting the weight factor in a symbol unit in accordance with an estimating result in estimating the amplitude so that a corrected soft decision value after correcting the soft decision value approaches to a predetermined amplitude range.

In the above reception apparatus, reception level detection means detects the reception level of a reception signal which has been encoded by an error correction code, and which has been modulated so as to represent one or more bits by one symbol, demodulation means demodulates the reception signal and generates a soft decision value for use in the decoding of the error correction code, and correction means corrects the soft decision value in such a way that the soft decision value generated by the demodulation means is multiplied by a preset weighting factor. Incidentally, the corrected soft decision value is used for the error correction decoding. Besides, in the reception apparatus, amplitude estimation means estimates the amplitude of the reception signal during a preset measurement time period, every measurement time period, and weighting-factor setting means variably sets the weighting factor in symbol units in accordance with the result of the estimation in the amplitude estimation means so that the soft decision value after the correction by the correction means may approach to a preset appropriate amplitude range. That is, the reception apparatus is an apparatus which incarnates the soft-decision-value correction method. Accordingly, the reception apparatus can attain to suppress a characteristic degradation ascribable to the fact that the amplitude of the reception signal is too small or too large. Besides, the influence of an instantaneous abnormal value ascribable to noise or the like can be suppressed more than in a prior-art apparatus which sets a weighting factor in accordance with an instantaneous reception amplitude. As a result, the weighting factor of high reliability can be set, and the soft decision value of high precision can be consequently obtained.

Alternatively, the apparatus may further include a reception level detecting element for detecting a reception level of the reception signal. The estimating element is capable of calculating a first estimation value, which is a ratio of a case where the reception level in every predetermined measurement time period exceeds a predetermined over-threshold value. The estimating element is capable of calculating a second estimation value, which is a ratio of a case where the reception level in every predetermined measurement time period falls below a predetermined under-threshold value. The under-threshold value is smaller than the over-threshold value. The setting element sets the weight factor to be an over-decision weight factor when the first estimation value is equal to or larger than a predetermined over-decision value. The setting element sets the weight factor to be an under-decision weight factor when the second estimation value is equal to or smaller than a predetermined under-decision value. Thus, the amplitude estimation means can be configured, for example, so as to evaluate a proportion at which the reception levels detected during the measurement time period are larger than a preset "too large" threshold value, as a first estimative value, and a proportion at which the reception levels are smaller than a "too small" threshold value set at a value smaller than the "too large" threshold value, as a second estimative value. In this case, the weighting-factor setting means may previously set a weighting factor value in the case where the first estimative value is equal to or larger than a preset "too large" decision value, and a weighting factor value in the case where the second estimative value is equal to or smaller than a preset "too small" decision value, so as to use the weighting factor value as the weighting factor for the multiplication.

Alternatively, the estimating element may be capable of calculating a third estimation value, which is an average of the reception level in every predetermined measurement time period, and the setting element sets the weight factor in accordance with a predetermined table defining a relationship between the reception level and the weight factor. Thus, the amplitude estimation means can be configured, for example, so as to evaluate the mean value of the reception levels within the measurement time period, as a third estimative value. In this case, the weighting-factor setting means may be configured so as to set the weighting factor in accordance with a correspondence table in which the corresponding relationship between reception levels and weighting factors is stipulated beforehand, on the basis of the third estimative value. According to the reception apparatus, the soft decision value can be corrected more finely, and the precision of the error correction decoding based on the soft decision value can be enhanced more.

Alternatively, the reception signal may be preliminarily processed by an orthogonal frequency division multiplexing method. The demodulating element demodulates a processed reception signal by using a plurality of sub-carriers. In this reception apparatus, as the demodulation means, it is also allowed to employ, for example, one which demodulates the reception signal that has been subjected to orthogonal frequency demultiplexing (OFDM) by using M (M being an integer of at least 2) subcarriers. In the reception apparatus having such demodulation means, the reception signal which has been subjected to the OFDM and whose peak to average power ratio (PAPR) is large, that is, a signal whose signal level will become too small or too large at a high possibility is handled, so-that the advantage of a characteristic improvement based on the correction of the soft decision value becomes more remarkable.

Alternatively, the reception signal may be preliminarily processed by a $2^N$-value orthogonal amplitude modulation method or a $2^N$-value phase modulation method. The demodulating element demodulates a processed reception signal. Thus, in the reception apparatus of the invention, as the demodulation means, it is also allowed to employ, for example, one which demodulates the reception signal that has been subjected to $2^N$ (N being a positive integer)-value orthogonal amplitude modulation (QAM) or $2^N$-value phase modulation (PSK), or one which demodulates the reception signal that has been primarily modulated by the $2^N$-value QAM or the $2^N$-value PSK and that has been subjected to the OFDM.

Alternatively, the apparatus may further include an automatic-gain-control amplifier for amplifying the reception signal. Thus, the reception apparatus may well be configured so as to effect the demodulation on the basis of the reception signal which is fed through an automatic-gain-control (AGC) amplifier. In this case, the measurement time period is set to be sufficiently shorter than the time constant of a circuit which evaluates the mean value of signal levels after amplification in the AGC amplifier, whereby the inappropriateness of a gain control attributed to the control delay of the AGC amplifier can be reliably compensated.

Alternatively, the demodulating element may demodulate the reception signal by using at least a predetermined number of samples of the reception signal. The estimating element estimates the amplitude of the reception signal by using a sample rate, which is obtained by multiplying the predetermined number of samples by a predetermined integer equal to or larger than two. In this case, Besides, in the reception apparatus of the invention, the amplitude estimation means should desirably be configured so as to estimate the amplitude at a sample rate which is P times (P being an integer of at least 2) larger than the number of samples necessary for the demodulation in the demodulation means. The demodulation of the reception signal or the estimation of the amplitude of the reception signal can be performed at a higher precision.

Alternatively, the apparatus may further include deinterleaving element for deinterleaving the soft decision value, which is corrected by the multiplying element. Thus, the reception apparatus of the invention may well include deinterleave means for deinterleaving the soft decision value corrected by the correction means. The error correction code is interleaved, whereby an immunity against a burst error which develops in a transmission line can be enhanced.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A method for correcting a soft decision value comprising:
    demodulating a reception signal, which is coded by an error correction code and modulated in order to represent one or multiple bits with one symbol;
    generating the soft decision value, which is used in decoding of the error correction code;
    multiplying the soft decision value by a weight factor so that the soft decision value is corrected;
    estimating an amplitude of the reception signal in every predetermined measurement time period; and
    variably setting the weight factor in a symbol unit in accordance with an estimating result in estimating the amplitude so that a corrected soft decision value after correcting the soft decision value approaches to a predetermined amplitude range.

2. A computer program product stored in a computer readable medium for correcting a soft decision value, the product comprising:
    an instruction for demodulating a reception signal, which is coded by an error correction code and modulated in order to represent one or multiple bits with one symbol;
    an instruction for generating the soft decision value, which is used in decoding of the error correction code;
    an instruction for multiplying the soft decision value by a weight factor so that the soft decision value is corrected;
    an instruction for estimating an amplitude of the reception signal in every predetermined measurement time period; and
    an instruction for variably setting the weight factor in a symbol unit in accordance with an estimating result in estimating the amplitude so that a corrected soft decision value after correcting the soft decision value approaches to a predetermined amplitude range.

3. A reception apparatus comprising:
    a demodulating element for demodulating a reception signal, which is coded by an error correction code and modulated in order to represent one or multiple bits with one symbol, and for generating the soft decision value, which is used in decoding of the error correction code;
    a multiplying element for multiplying the soft decision value by a weight factor so that the soft decision value is corrected;
    an estimating element for estimating an amplitude of the reception signal in every predetermined measurement time period; and
    a setting element for variably setting the weight factor in a symbol unit in accordance with an estimating result in estimating the amplitude so that a corrected soft decision value after correcting the soft decision value approaches to a predetermined amplitude range.

4. The apparatus according to claim 3, further comprising:
    a reception level detecting element for detecting a reception level of the reception signal, wherein
    the estimating element is capable of calculating a first estimation value, when the reception level in every predetermined measurement time period exceeds a predetermined over-threshold value,
    the estimating element is capable of calculating a second estimation value, when the reception level in every predetermined measurement time period falls below a predetermined under-threshold value,
    the under-threshold value is smaller than the over-threshold value,
    the setting element sets the weight factor to be an over-decision weight factor when the first estimation value is equal to or larger than a predetermined over-decision value, and
    the setting element sets the weight factor to be an under-decision weight factor when the second estimation value is equal to or smaller than a predetermined under-decision value.

5. The apparatus according to claim 4, wherein
    the estimating element is capable of calculating a third estimation value, which is an average of the reception level in every predetermined measurement time period, and
    the setting element sets the weight factor in accordance with a predetermined table defining a relationship between the reception level and the weight factor.

6. The apparatus according to claim 3, wherein
    the reception signal is preliminarily processed by an orthogonal frequency division multiplexing method, and
    the demodulating element demodulates the processed reception signal by using a plurality of sub-carriers.

7. The apparatus according to claim 3, wherein
    the reception signal is preliminarily processed by a $2^N$-value orthogonal amplitude modulation method or a $2^N$-value phase modulation method, and
    the demodulating element demodulates the processed reception signal.

8. The apparatus according to claim 3, further comprising:
    an automatic-gain-control amplifier for amplifying the reception signal.

9. The apparatus according to claim 3, wherein
    the demodulating element demodulates the reception signal by using at least a predetermined number of samples of the reception signal,
    the estimating element estimates the amplitude of the reception signal by using a sample rate, which is obtained by multiplying the predetermined number of samples by a predetermined integer equal to or larger than two.

10. The apparatus according to claim 3, further comprising:
    a deinterleaving element for deinterleaving the corrected soft decision value.

* * * * *